Aug. 9, 1960 J. G. A. BOURGET 2,948,888

MAGNETIC ENERGY TRANSMITTER FOR A REMOTE CONTROL SYSTEM FOR A TELEVISION RECEIVER

Filed March 15, 1957

INVENTOR.
JOSEPH G. ANDRE BOURGET.
BY Alden D. Redfield
Irwin P. Garfinkle
ATTORNEYS.

United States Patent Office 2,948,888

Patented Aug. 9, 1960

2,948,888

MAGNETIC ENERGY TRANSMITTER FOR A REMOTE CONTROL SYSTEM FOR A TELEVISION RECEIVER

Joseph G. Andre Bourget, Chicago, Ill., assignor to Avco Manufacturing Corporation, Cincinnati, Ohio, a corporation of Delaware Filed Mar. 15, 1957, Ser. No. 646,396

2 Claims. (Cl. 340—345)

This invention relates generally to a remote control system for television receivers and, more particularly, to a transmitter of pulses of magnetic energy for controlling the operation of a television receiver from a remote location.

In most home television receivers, a turret-type, manually-operable tuner is mounted on the television receiver chassis and, when it is desired to turn the receiver on or off or to change channels, it is necessary that the adjustment be made at the television receiver. A system of wireless remote control comprising a remote transmitter and a local receiver has been disclosed and claimed in a copending application filed by Christian Carl Pfitzer and myself on this date and assigned to the same assignee as this invention. In that application the receiver of the control system is mounted locally at the television chassis and directly controls the operation of the television tuner and the application of power to the chassis. The transmitter is remotely located at a range of from three to twenty-five feet from the receiver, and it generates pulses of magnetic energy to control the operation of the local receiver. The primary object of the present invention is to provide an efficient and inexpensive system which will be useful in the remote transmitting portion of the wireless control system of the type disclosed in said copending application.

A further object of this invention is to provide a transmitter for generating pulses of magnetic energy in the audio frequency range by means of a mechanically vibrating reed connected across a resonant circuit.

Another object of this invention is to provide a high Q resonant circuit for efficiently radiating magnetic energy.

For a more comprehensive understanding of the nature and objects of this invention, reference should now be made to the following detailed description and to the accompanying drawings, in which.

In the aforesaid copending application the wireless remote control system disclosed is used for controlling the operation of a television having a motor-driven, turret-type tuner. The remote control system comprises a transmitter for generating pulses of magnetic energy and a receiver for receiving the generated energy. The receiver comprises an amplifier, a limiter, a detector, an integrator and two thyratrons. Receipt of a first series of pulses in the receiver fires one thyratron to operate the tuner motor and to connect the second thyratron in circuit. A second series of pulses fires the second thyratron to turn the television off or on. This application for patent is chiefly concerned with the transmitter portion of the system which is used to generate signals for controlling the receiver operation.

Early investigations to produce short range transmitters for use in control systems for television receivers suggested a number of transmission mediums. Among those considered were light beams, ultrasonic waves, radio waves, and magnetic fields. Since apparatus for generating magnetic fields is available and inexpensive, and since difficulties due to extraneous sources and stability are readily overcome, generation by this medium presents the best method of wireless remote control for the desired range of operation. For commercially available home television receivers, successful results have been achieved with the use of magnetic waves transmitted in the audio frequency range between 4,500 and 6,000 cycles. Within this range of frequencies there is no conflict with the magnetic field generated by the deflection circuits of the television receiver and, moreover, these frequencies are below the range regulated by the Federal Communications Commission.

Generally, the transmitter comprises an antenna which is designed for efficiently generating a strong external magnetic field in the audio frequency range. The antenna coil is tuned to the desired audio frequency by a parallel-connected condenser, and the magnetic field is produced by winding the coil on a ferrite rod. The antenna is supplied with energy from an oscillator which, in the preferred embodiment, comprises a mechanically vibrating reed for opening and closing a circuit from a battery to the antenna network.

Figure 1:
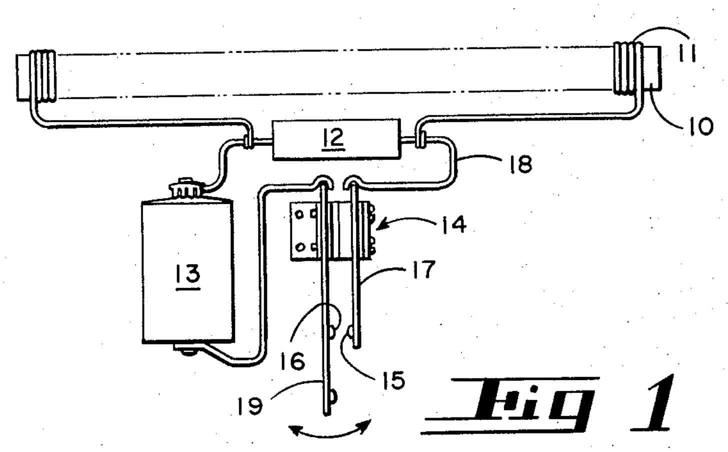
Fig. 1 illustrates a preferred form of the transmitter used in accordance with this invention.
Figure 2:
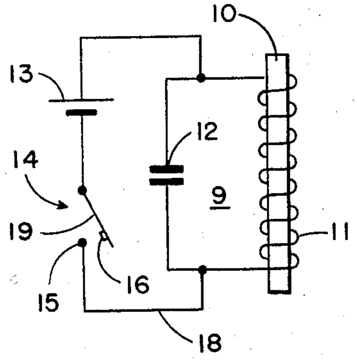
Fig. 2 is a schematic wiring diagram of the apparatus illustrated in Fig. 1.

Referring to Figs. 1 and 2, the transmitter comprises a resonant tank 9 consisting of a ferrite rod 10 on which is wound a coil 11 tuned to the desired operating frequency by means of a condenser 12. The resonant tank 9 is energized from a D.C. voltage supply which may consist of an ordinary flashlight cell 13 connected in series with a reed-type switch 14. The switch 14 includes a pair of contacts 15 and 16 which are adapted to open and close the circuit from the battery to the resonant tank 9. The contact 15 is fixedly mounted on a metallic conductor 17 which is connected by a lead 18 to one end of coil 11 and the condenser 12, while the contact 16 is mounted on a conductive, metallic reed 19. When the reed 19 is mechanically tripped by any suitable means (not shown), the vibration or oscillation of the reed causes the circuit through the battery 13, to contacts 15 and 16, and the resonant tank 99 to be alternately opened and closed.

Figure 3:
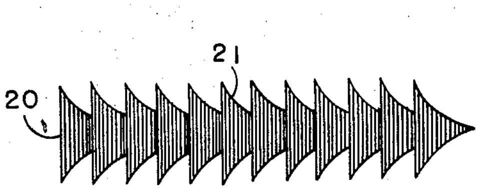
Fig. 3 represents the wave form generated by the transmitter illustrated in Figs. 1 and 2.

When the contacts 15 and 16 are closed, the battery voltage is impressed across the coil 11 to produce a magnetic field; when opened, the magnetic field collapses, and the tuned tank circuit 9 comprising the coil 11 and condenser 12 produces a series of damped oscillations. The wave form of the magnetic energy produced for transmission from the tank 9 is illustrated in Fig. 3, and it constitutes an audio frequency wave 20 modulated with a wave form 21 having the frequency of the vibrating reed 19. In practice, the reed is designed to vibrate sufficiently to cause about twelve closings and openings of the contacts 15 and 16.

The circuit illustrated in Figs. 1 and 2 must have a high Q in order to efficiently radiate magnetic energy. Factors which contribute to a high Q are a concentration of the windings in the center of the core, close contact between the wires and the core, a low L.-C. ratio, and a high permeability, low-loss core. On the other hand, external field strength along the axis of the coil is directly related to the total flux in the core, and thus to the cross section area and length of the coil, as well as to the turns-amperes in the coil when the contacts 15 and 16 are closed. Thus, a comprise must be made between the Q of the coil and the winding length and diameter. In a practical embodiment having a diameter of ⅝ inches and a length of 8 inches, and with the coil 11 extended over the entire legnth of the ferrite core 10, a maximum external magnetic field was provided, and the Q of the coil was found to be sufficiently high for efficient operation.

For use in the system described in the aforementioned copending application of Pfitzer and myself, the axis of the coil 11 and ferirte core 10 are mounted parallel with the axis of the receiver coil to achieve maximum coupling. When it is desired to change channels in the television receiver, one series of pulses will be transmitted by tripping the reed 19; when it is desired to turn the television receiver off, the reed 19 is tripped twice.

While the transmitter described herein may find most utility in combination with a television remote control system, it is to be understood that its use is not so limited, but it may be used for any application where magnetic energy in the wave form illustrated in Fig. 3 is desired, and that the scope of this invention is limited only by the prior art and the terms of the appended claims.

What I claim as my invention is:

1. In a wireless magnetic energy system for controlling the operation of a television receiver from a remote location, apparatus for generating magnetic energy in a selected audio frequency range, the combination comprising: an antenna coil wound on a cylindrical ferrite core, the ratio of the length to the diameter of said ferrite core being high, the windings of said antenna coil being distributed over substantially the entire length of said core; a condenser connected across said coil forming a resonant tank circuit at said selected audio frequency; and a source of direct current and a vibrating switch in series with said coil, said switch having a manually operable vibratile member with a period of vibration at a rate which is substantially lower than said selected audio frequency, whereby said selected audio frequency is modulated with a wave form having the frequency of said vibratile member.

2. The invention as defined in claim 1 wherein said vibrating switch comprises a moveable contact mounted on a conductive reed and a fixed contact associated with said moveable contact, whereby said source of direct voltage is connected and disconnected from said coil when said contacts are engaged and disengaged.

References Cited in the file of this patent

UNITED STATES PATENTS

| | | |
|---|---|---|
| 1,254,658 | Clausen | Jan. 29, 1918 |
| 1,760,479 | Colman | May 27, 1930 |
| 2,295,442 | Wilhelm | Sept. 8, 1942 |
| 2,345,472 | Goldsmith | Mar. 28, 1944 |
| 2,494,451 | Olson | Jan. 10, 1950 |
| 2,581,348 | Bailey | Jan. 8, 1952 |
| 2,641,704 | Stott | June 9, 1953 |
| 2,695,951 | Hupert et al. | Nov. 30, 1954 |
| 2,740,113 | Hemphill | Mar. 29, 1956 |

FOREIGN PATENTS

| | | |
|---|---|---|
| 910,891 | France | Feb. 18, 1946 |
| 747,231 | Great Britain | Mar. 28, 1956 |

OTHER REFERENCES

"Basic Course in Electronics," by United States Naval Institute, 2nd edition, copyright 1950.